United States Patent
Patapoutian et al.

(10) Patent No.: US 6,412,088 B1
(45) Date of Patent: Jun. 25, 2002

(54) METHOD AND APPARATUS FOR USING BLOCK REREAD

(75) Inventors: Ara Patapoutian, Westborough; Michael D. Leis, Framingham; Mathew P. Vea, Shrewsbury, all of MA (US)

(73) Assignee: Maxtor Corporation, Longmont, CO (US)

(*) Notice: Subject to any disclaimer, the term of this patent is extended or adjusted under 35 U.S.C. 154(b) by 0 days.

(21) Appl. No.: 09/453,164

(22) Filed: Dec. 2, 1999

(51) Int. Cl.$^7$ .............................................. G11C 29/00
(52) U.S. Cl. ........................ 714/764; 714/769; 714/751
(58) Field of Search ................................ 714/751, 763, 714/769, 764, 45, 48; 365/200, 201; 360/27, 26, 36.1, 47, 53; 369/53, 44, 59.21

(56) References Cited

U.S. PATENT DOCUMENTS

| | | | |
|---|---|---|---|
| 4,535,455 A | * 8/1985 | Peterson | 714/48 |
| 5,163,162 A | * 11/1992 | Berry et al. | 369/43 |
| 5,227,930 A | * 7/1993 | Thanos et al. | 360/77.03 |
| 5,630,005 A | * 5/1997 | Ort | 386/111 |
| 5,748,045 A | * 5/1998 | Tateishi | 331/14 |
| 6,084,734 A | * 7/2000 | Southerland et al. | 360/25 |

OTHER PUBLICATIONS

Patapoutian et al. "The Effect of Reread on Data Reliability"; IEEE Transactions on Magnetics, vol. 33, No. 5, Sep., 19971 pp. 2710–2712.

* cited by examiner

Primary Examiner—Albert Decady
Assistant Examiner—Matt Dooley
(74) Attorney, Agent, or Firm—Pillsbury Winthrop LLP

(57) ABSTRACT

Disclosed is a method and apparatus for increasing the reliability of a disk drive. A block of information is read from a storage medium to provide a first sample, which is stored. The method determines whether an uncorrectable error occurred during the reading, and when the error is determined to have occurred, the block of information is reread from the storage medium to provide an averaged sample, and the average sample is decoded. Further disclosed is a storage unit, which includes a reader for reading a block of information from a storage medium to provide a first sample and for storing said first sample. An error determining mechanism determines whether an uncorrectable error occurred during the reading and issues a command to the reader to re-read the block of information to provide a second sample when the uncorrectable error is determined. A processor receives and averages the first sample and the second sample and produces an averaged sample. A decoder decodes the average sample.

23 Claims, 4 Drawing Sheets

METHOD AND APPARATUS FOR USING BLOCK REREAD

BACKGROUND OF THE INVENTION

1. Field of the Invention

The invention pertains to the field of reliably receiving information for a computer. Such information can be received from a storage device or can be received from another computer communicating via a data communication protocol.

2. Description of Background Information

Prior art disk drives specify that they will deliver data to a computer with a reliability of at most one failure in about every $10^{13}$ blocks of data, wherein a block is typically 512 bytes. However, the prior art disk drives do not provide this level of reliability by reading a block only once. The drive may attempt to read the block multiple times as long as the overall throughput is not reduced significantly. It is estimated that as long as a drive reads a block no more than once every $10^5$ blocks the throughput is degraded by less than one percent.

Prior art disk drives increase reliability by performing independent rereads. That is, when an uncorrectable error is detected on the first read, the first read is ignored and the block is reread. A mathematical analysis of such a scheme was given by Ara Patapoutian and Mathew Vea, "The Effect of a Reread on Data Reliability", *IEEE Transactions on Magnetics*, Vol. 33, No. 5, September 1997.

Another prior art rereading scheme was proposed in which two blocks are compared after data detection to find erasures, which in turn helps the ECC.

SUMMARY

An embodiment of the invention is a method for increasing the reliability of a disk drive. A block of information is read from a storage medium to provide a first sample, which is stored. The method determines whether an uncorrectable error occurred during the reading, and when the error is determined to have occurred, the block of information is reread from the storage medium to provide a second sample. The first and the second sample are averaged to provide an averaged sample, and the averaged sample is decoded.

Another embodiment of the invention is a storage unit. The storage unit includes a reader for reading a block of information from a storage medium to provide a first sample and for storing said first sample. An error determining mechanism determines whether an uncorrectable error occurred during the reading and issues a command to the reader to re-read the block of information to provide a second sample when the uncorrectable error is determined. A processor receives and averages the first sample and the second sample and produces an averaged sample. A decoder decodes the averaged sample.

BRIEF DESCRIPTION OF THE DRAWINGS

The invention is described in the following section in detail with reference to the figures which include.

DETAILED DESCRIPTION

Figure 1:
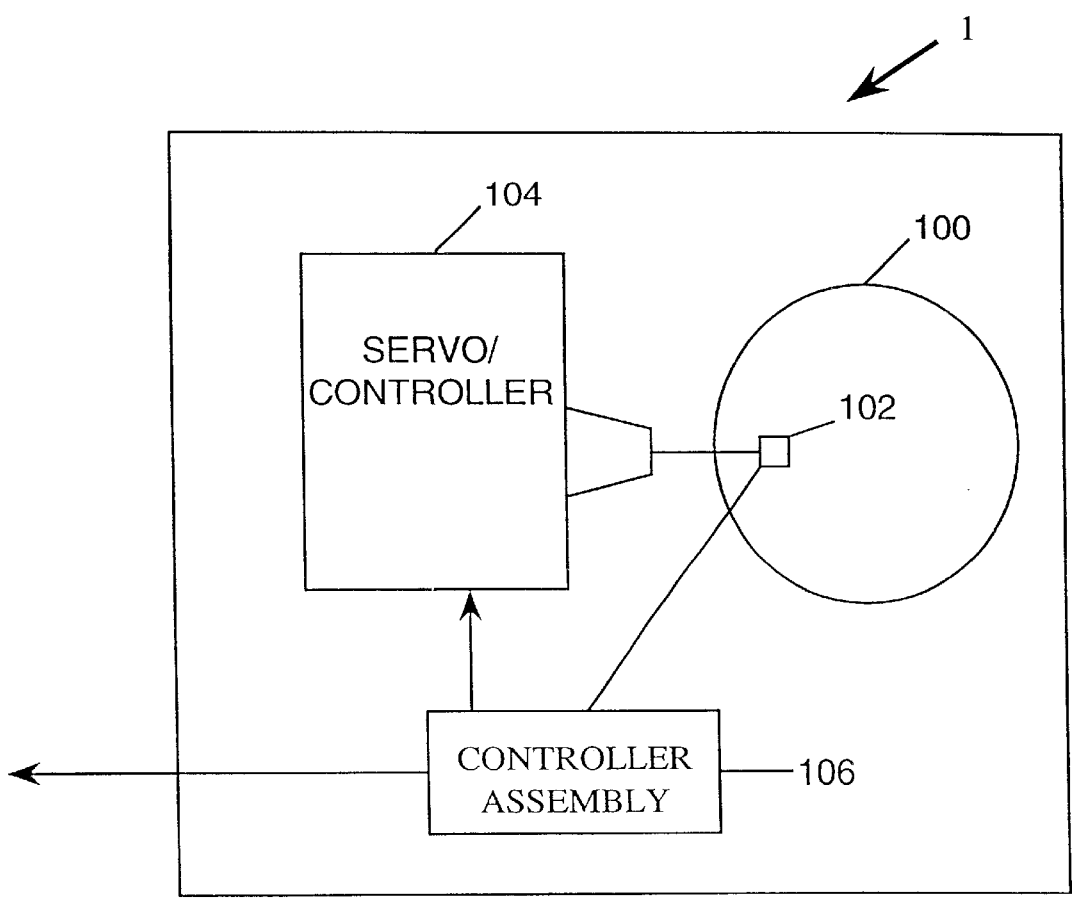
FIG. 1, which shows a storage or disk drive unit 1.

FIG. 1 is a schematic diagram of a storage unit or disk drive unit 1. The disk drive 100 can be read from and written to by the read/write head 102. The movement of the read/write head 102 is controlled by the servo/controller assembly 104. The servo/controller assembly 104 and the read/write head 102 are included in the read assembly of the storage unit or disk drive unit 1. During a read operation, the read/write head 102 reads information from a block on the disk and sends the information to the controller assembly 106 as analog signals after passing the signals through an amplifier and a filter.

Figure 2:
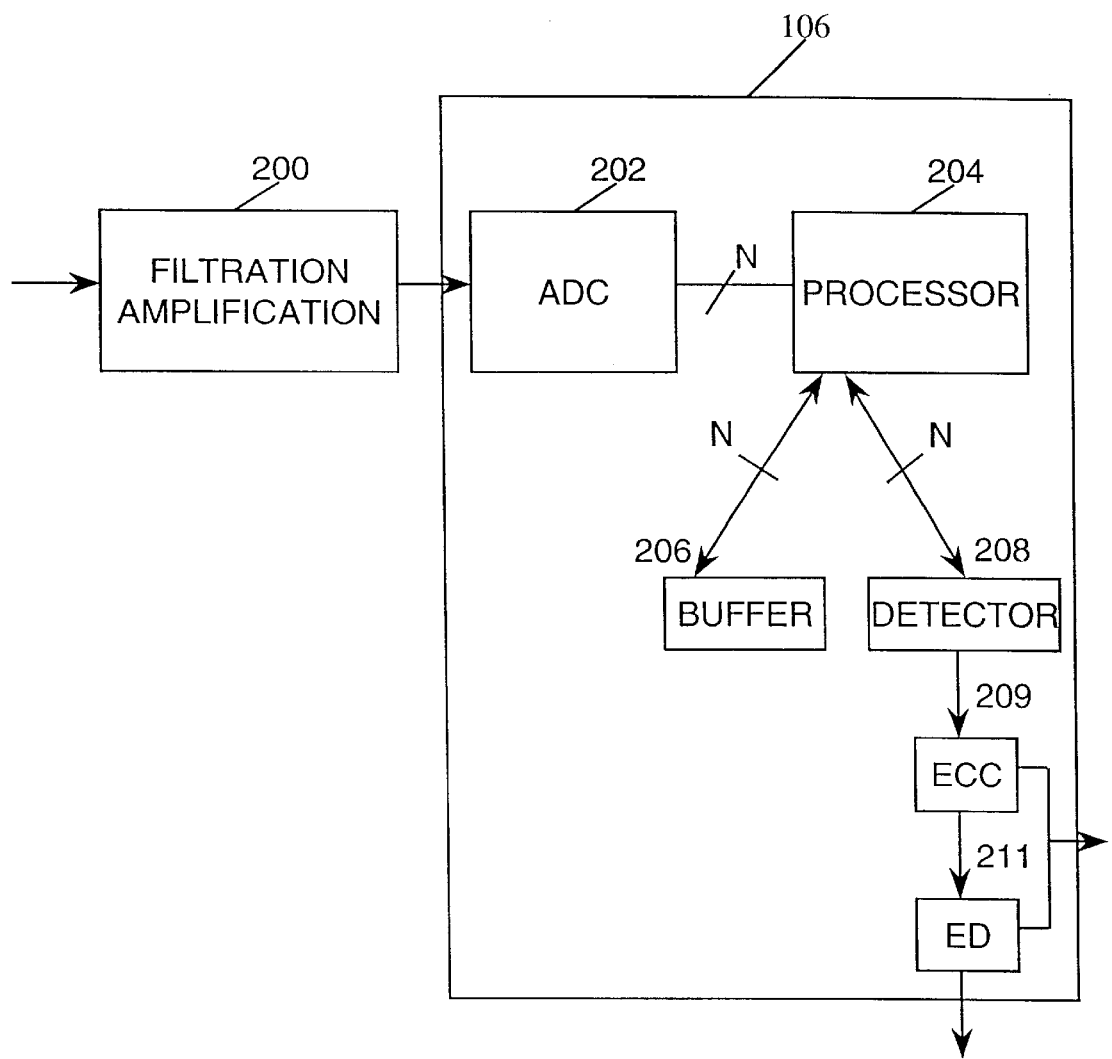
FIG. 2, which shows the controller 106 of FIG. 1 in more detail.

FIG. 2 shows a more detailed illustration of controller 106. The signal read by the read/write head 102 passes through an amplifier and a low band pass filter (filtration/amplification) 200 to amplify and filter the analog signal. The filtered and amplified signal is then passed to an analog to digital converter (ADC) 202 which digitizes the signal. Each portion of the signal, which corresponds to a bit of information, is digitized to an N-bit value. In the preferred embodiment, N=6 bits.

The output of the analog-to-digital converter 202 is the input to a processor 204 for multiplying each digitized value by a weighted value. The N-bit output of the processor 204 is fed to both a buffer 206 and a detector 208.

The detector 208 converts each of the N-bit digitized values to either a zero or a one and outputs the zero or one to an ECC 209. When a block of information has been output from the detector 208 to the ECC 209, the ECC hardware or software attempts to detect and correct bit errors.

If the ECC 209 detects an uncorrectable error, a signal or command is sent to cause the block of information to be reread by the read/write head 102.

If the ECC 209 either did not detect or correct any errors, then the block is sent to error detector 211 to determine if there are any errors not detected or corrected by the ECC 209.

If the error detector 211 detects an error, the signal or command is sent to cause the block of information to be reread.

If the error detector 211 does not detect an error, a block of information is sent to the computer.

Figure 3A:
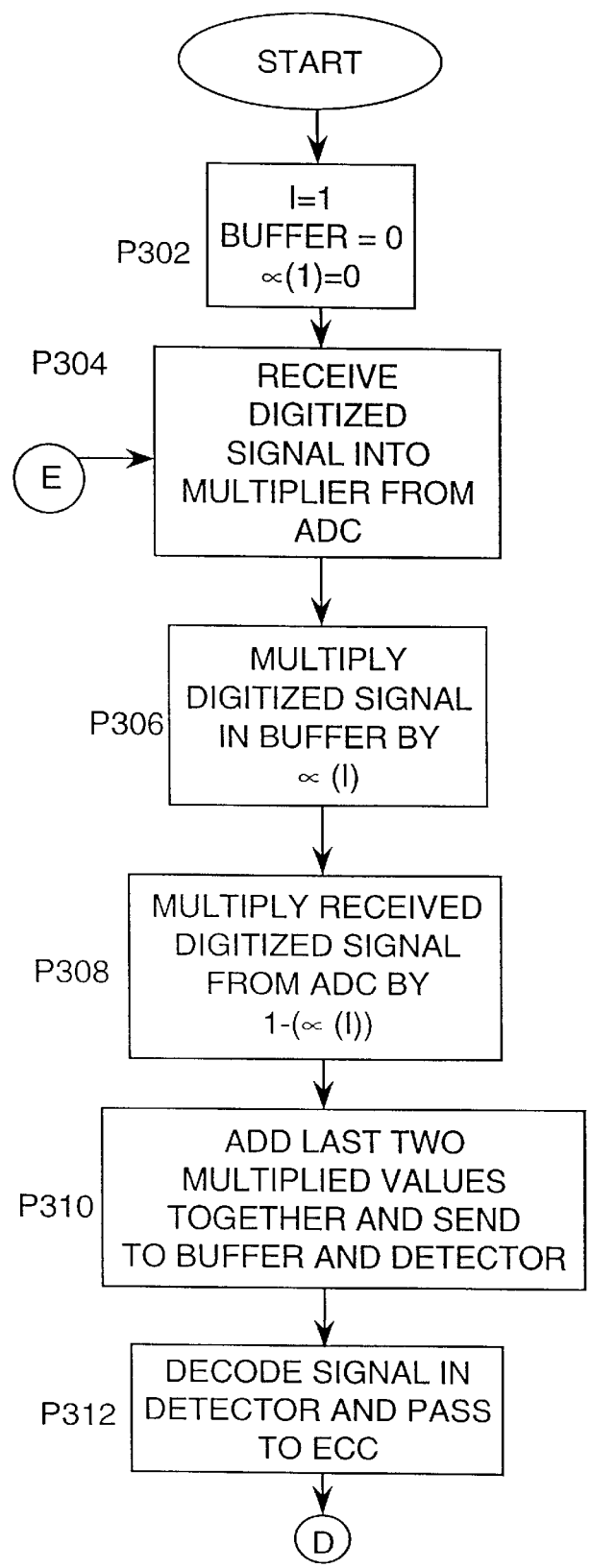
FIGS. 3A–3B, which are flowcharts describing an embodiment of the invention.
Figure 3B:
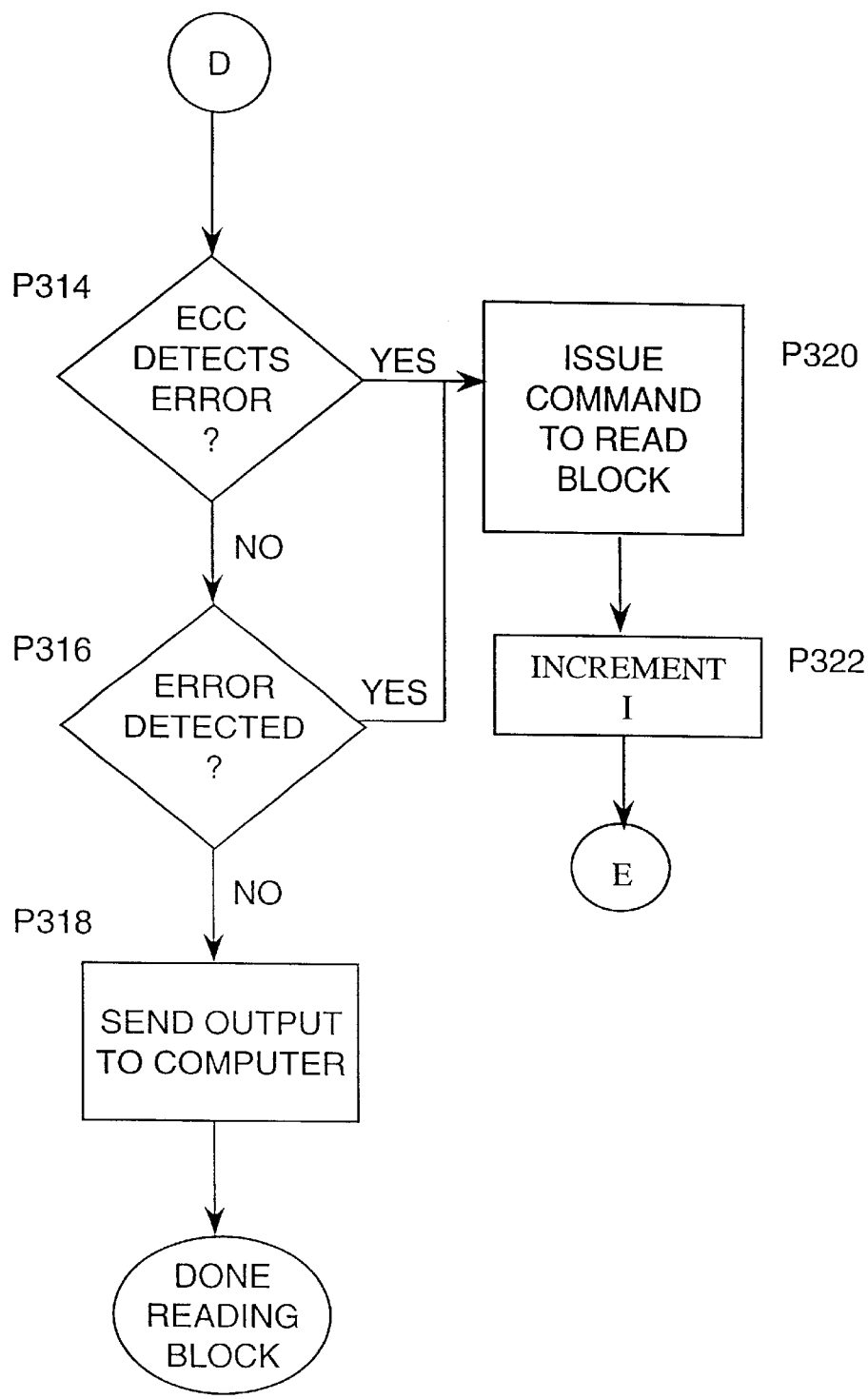

FIGS. 3A–3B describe the processing that takes place, in an embodiment of the invention. The embodiment may be limited to any number or reads, for example, 10 rereads.

In P302, variables are initialized. For example, a counter, I, is set to 1, buffer 206 is initialized to zeroes and an array of $\alpha$ values is initialized, one $\alpha$ value being used for each reread, the first $\alpha$ value of the array being set to zero.

In P304, the read information had passed through read/write head 102 and the filtration/amplification 200 to the controller assembly 106. 1n the controller assembly 106, the amplified and filtered signal is passed to ADC 202 which digitizes the signal into an N-bit value, as described previously.

In P306, the value stored in the buffer 206 (note the buffer is initialized to zero) is passed to a processor 204, where it is multiplied by the value of $\alpha$. For example, for a first read the digitized signal would be multiplied by a value of $\alpha(1)$, having a value of 0.

In P308, the received digitized signal from ADC 202 is sent to the processor 204, where it is multiplied by $(1-\alpha(1))$, which for the first read would be a value of 1 and in P310, the two multiplied values would be added together by processor 204 and sent to the buffer 206 and to the detector 208.

In P312, each of the N-bit digitized values is detected and decoded to either a 0 or a 1 and passed to the hardware or software ECC 209, as described earlier.

In P314, after receiving a block of information for the detector 208, the ECC hardware or software 209 determines whether or not an uncorrectable error occurred and if not, passes the digitized values to the error detector 211.

In P316, the error detector 211 determines whether there is an error that was not detected by the ECC 209 and if not, the decoded read block is sent to the computer and the read process for reading the block is completed.

If either P314 or P316 detects an error, then P320 will be performed to send a signal or command to cause the block of information to be reread and P322 is performed to increment counter I. After the block of information is read by the read/write head 102, amplified and filtered, passed to the controller assembly 106 and digitized by ADC 202, P304 is again performed to read the digitized signal into the processor 204.

In P306, the saved value in buffer 206 is read and multiplied by $\alpha(2)$, which in this case would be the weighted value to use for a first read when performing a second reading of the block of information.

In P308, the recently read digitized value is sent into the processor 204 and multiplied by $(1-\alpha(2))$. The remainder of the processing continues as previously described. One of ordinary skill in the art would understand how this process would continue for any number of reads. For example, on a third reading of the block $\alpha(3)$ may be 0.6, since it is the weight of two previous reads.

The invention works well in a situation in which a large component of the noise is not repeatable noise. Repeatable noise will be repeated in exactly the same places for each reread and includes sources such as media (transition) noise, nonlinear transition shift (NLTS) after precompensation, partial erasure, overwrite noise, thermal asparities, media defects and adjacent off-track writes. Non-repeatable noise gives the invention an opportunity to recover a failed sector on two or more reads. Examples of sources of nonrepeatable noise are electronic noise, read head noise and the non-repeatable component of track misregistration.

Some weighted values are easier for calculation purposes, for example, weighted values that allow recalculation to be performed by performing right shifts of the digitized value and then adding or subtracting a value. For example, an embodiment may use values of $\alpha$, such as $\alpha(1)=0$, $\alpha(2)=3/8$ or $7/16$, $\alpha(3)=12/16$. $3/8$ can be derived from $(1/2-1/8)$, which can be achieved by shifting the original digitized value 1 bit position to the right, shifting the original digitized value 3 bit positions to the right, and subtracting the second value from the first value. $7/16$ can be derived from $8/16-1/16$, which can be achieved by shifting the original digitized value 1 bit position to the right, shifting the original digitized value 4 bit positions to the right, and subtracting the second value from the first value. $12/16$ can be derived from $8/16+4/16$, which can be achieved by shifting the original digitized value 1 bit position to the right, shifting the original digitized value 2 bit positions to the right, and adding the two values.

Further, the values of $\alpha$ can be predetermined such that after a specific number of unsuccessful attempts to read a block, the previous read attempts will be ignored. For example, if $\alpha(5)$ was set to 0, then on the fifth read attempt, the previous read attempts would be ignored because they would receive the weighting of $\alpha(5)$ or 0, and the information from the fifth read attempt would be given a weight of $1-\alpha(5)$, or 1-0, which is 1.

Furthermore, the weighting parameter $\alpha$ depends on four values, signal-to-noise ratio (SNR), a repeatable noise component, block length, and ECC correction power.

This invention, although described in terms of a disk drive, is not limited to only disk drives. The above strategy can be used in other storage devices, for example tape drives or optical drives. The invention can also be used in the field of data communications. For example, a weighted parameter $\alpha$ can be used when the need arises to re-receive data, in the same manner as described above for re-reading information. In other words, previous erroneous receptions of data can be averaged together just as previous reads can be averaged together when reading from a storage device. The invention is only limited by the scope of the claims which follow.

We claim as our invention:

1. A method comprising:
   reading a block of information from a storage medium to provide a first sample and storing said first sample;
   determining whether an uncorrectable error occurred during said reading, and when said determining determines said error:
   rereading said block of information from said storage medium to provide a second sample,
   averaging said first sample and said second sample to provide an averaged sample, and
   decoding said averaged sample.

2. The method according to claim 1, wherein: said reading comprises:
   sampling said block of information to provide a first plurality of analog signals,
   converting said first plurality of analog signals, via an analog-to-digital converter, to said first sample, and said rereading comprises:
   sampling said block of data to provide a second plurality of analog signals,
   converting said second plurality of analog signals via an analog-to-digital converter to said second sample.

3. The method according to claim 1, wherein said averaging comprises:
   applying a first weight $\alpha$ to said first sample and a second weight to said second sample, wherein said averaged sample provided by said averaging is a weighted average.

4. The method according to claim 2, wherein said averaging comprises:
   applying a first weight $\alpha$ to said first sample and a second weight to said second sample, wherein said averaged sample provided by said averaging is a weighted average.

5. The method according to claim 3, wherein said first weight $\alpha$ is a value greater than 0 and less than 1 and said second weight is a value equal to $(1-\alpha)$.

6. The method according to claim 4, wherein said first weight $\alpha$ is a value greater than 0 and less than 1 and said second weight is a value equal to $(1-\alpha)$.

7. The method according to claim 3, wherein said value of said first weight $\alpha$ is based on at least one of a SNR, a repeatable noise component, a block length, and an ECC correction power.

8. The method according to claim 4, wherein a value of said first weight $\alpha$ is based on at least one of a SNR, a repeatable noise component, a block length, and an ECC correction power.

9. A storage unit comprising:
   a read assembly for controlling a reading of information from a predetermined area of a medium; and
   a controller assembly for receiving a plurality of signals representing said information on said predetermined area of said medium, said controller assembly comprising:

a converter which converts a first plurality of signals received from said read assembly to a first sample, and which converts a second plurality of signals received from said read assembly to a second sample, said first plurality of signals and said second plurality of signals corresponding to information on said predetermined area of said medium, a processor which receives said first and said second samples from said converter and averages said first and said second samples to provide an averaged sample, an error detection mechanism which determines whether said first sample includes an uncorrectable error and if said uncorrectable error is detected, informs said read assembly to re-read said information on said predetermined area of said medium, and a decoder for decoding said averaged sample.

10. The storage unit according to claim 9, wherein:

said converter is an analog-to-digital converter, and said first plurality of signals and said second plurality of signals are analog signals.

11. The storage unit according to claim 9, wherein said:

processor applies a first weight $\alpha$ to said first sample and a second weight to said second sample, and said averaged sample is a weighted sample.

12. The storage unit according to claim 11 wherein said first weight $\alpha$ is a value greater than 0 and less than 1 and said second weight is a value equal to (1-$\alpha$).

13. The storage unit according to claim 11, wherein a value of said first weight $\alpha$ is based on at least one of a SNR, a repeatable noise component, a block length, and an ECC correction power.

14. A storage unit comprising:

a reader for reading a block of information from a storage medium to provide a first sample;

an error determining mechanism which determines whether an uncorrectable error occurred during said reading and which issues a command to said reader to re-read said block of information to provide a second sample when said uncorrectable error is determined;

a processor for receiving and averaging said first sample and said second sample and producing an averaged sample, and a decoder for decoding said averaged sample.

15. The storage unit according to claim 14, wherein:

said processor applies a first weight $\alpha$ to said first sample and a second weight to said second sample, and said averaged sample provided by said processor is a weighted sample.

16. The storage unit according to claim 15 wherein said first weight $\alpha$ is a value greater than 0 and less than 1 and said second weight is a value equal to (1-$\alpha$).

17. The storage unit according to claim 15, wherein a value of said first weight $\alpha$ is based on at least one of a SNR, a repeatable noise component, a block length, and an ECC correction power.

18. A controller assembly for a storage unit comprising:

a converter for receiving and converting a first plurality of signals from a read assembly to produce a first sample and for receiving and converting a second plurality of signals from said read assembly to produce a second sample;

an error determination mechanism for determining whether said first sample includes an uncorrectable error and for informing a read assembly to re-read information on said predetermined area of said medium to provide said second plurality of signals when said uncorrectable error is determined to have occurred;

a processor for averaging said first sample and said second sample to provide an averaged sample; and a decoder for decoding said averaged sample.

19. The controller assembly according to claim 18, wherein:

said converter comprises an analog-to-digital converter, and said first plurality of signals and said second plurality of signals are analog signals.

20. The storage unit according to claim 18, wherein:

said processor applies a first weight $\alpha$ to said first sample and a second weight to said second sample, and said averaged sample provided by said processor is a weighted sample.

21. The storage unit according to claim 20 wherein said first weight $\alpha$ is a value greater than 0 and less than 1 and said second weight is a value equal to (1-$\alpha$).

22. The storage unit according to claim 20, wherein a value of said first weight $\alpha$ is based on at least one of a SNR, a repeatable noise component, a block length, and an ECC correction power.

23. A method comprising:

receiving a unit information to provide a first sample and storing said first sample;

determining whether an uncorrectable error occurred during said receiving, and when said determining determines said error:

re-receiving said unit of information to provide a second sample, averaging said first sample and said second sample to provide an averaged sample, and determining whether said averaged sample has an uncorrectable error.

* * * * *